(12) United States Patent
McCaughan et al.

(10) Patent No.: US 11,825,222 B2
(45) Date of Patent: Nov. 21, 2023

(54) IMAGE DEMOSAICING TAKING ACCOUNT OF CHROMATIC ABERRATION

(71) Applicant: Plantronics, Inc., Santa Cruz, CA (US)

(72) Inventors: Gareth John McCaughan, Cambridge (GB); Euan Christopher Smith, Longstanton (GB)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 17/622,492

(22) PCT Filed: Jun. 26, 2020

(86) PCT No.: PCT/EP2020/068010
§ 371 (c)(1),
(2) Date: Dec. 23, 2021

(87) PCT Pub. No.: WO2020/260574
PCT Pub. Date: Dec. 30, 2020

(65) Prior Publication Data
US 2022/0247987 A1 Aug. 4, 2022

(30) Foreign Application Priority Data
Jun. 26, 2019 (GB) .................................. 1909187

(51) Int. Cl.
*H04N 25/611* (2023.01)
*G06T 3/40* (2006.01)
(Continued)

(52) U.S. Cl.
CPC .......... *H04N 25/611* (2023.01); *G06T 3/4015* (2013.01); *H04N 23/843* (2023.01); *H04N 25/134* (2023.01); *G06T 2207/10024* (2013.01)

(58) Field of Classification Search
CPC .......... H04N 9/04515; H04N 9/04517–04519; H04N 23/843; H04N 25/611; H04N 25/6153; G06T 3/4015; G06T 2207/10024
See application file for complete search history.

(56) References Cited

U.S. PATENT DOCUMENTS

| 8,494,260 B2 | 7/2013 | Sawada | |
| 2004/0240726 A1* | 12/2004 | Stavely | H04N 9/04515 348/E9.003 |

(Continued)

FOREIGN PATENT DOCUMENTS

| JP | 20130207440 A | 10/2013 |
| WO | 2016/128761 A1 | 12/2020 |

OTHER PUBLICATIONS

International Search Report and Written Opinion for corresponding PCT Patent Application No. PCT/EP2020/068010 dated Oct. 30, 2020.

(Continued)

*Primary Examiner* — Paul M Berardesca
(74) *Attorney, Agent, or Firm* — QUARLES & BRADY LLP

(57) ABSTRACT

A method of chromatically-corrected image demosaicing for a sensor with a colour filter array (CFA) such as a Bayer filter array. The demosaicing makes use of local chromatic aberration correction data to determine chromatically-corrected pixel positions for spatial interpolation. In implementations a chromatically-corrected quadratic adjustment is also applied.

18 Claims, 5 Drawing Sheets

(51) Int. Cl.
   *H04N 23/84*   (2023.01)
   *H04N 25/13*   (2023.01)

(56) References Cited

U.S. PATENT DOCUMENTS

| | | | | |
|---|---|---|---|---|
| 2009/0202171 A1* | 8/2009 | Kasahara | ........... | H04N 9/04517 |
| | | | | 382/275 |
| 2010/0214446 A1* | 8/2010 | Watarai | .............. | H04N 9/04515 |
| | | | | 348/E9.037 |
| 2011/0043657 A1 | 2/2011 | Hara | | |
| 2016/0260197 A1* | 9/2016 | Hada | .................... | H04N 1/6008 |

OTHER PUBLICATIONS

Malvar-He-Cutler Linear Image Demosaicing, P. Getreuer, Image Processing on Line, 1 (2011), pp. 83-89.
Weerasinghe, et al.; "Method of color interpolation in a single sensor color camera using green channel separation", University of Wollongong, 2002.

* cited by examiner

IMAGE DEMOSAICING TAKING ACCOUNT OF CHROMATIC ABERRATION

RELATED APPLICATIONS

The present invention is a U.S. National Stage under 35 USC 371 patent application, claiming priority to Serial No. PCT/EP2020/068010, filed on Jun. 26, 2020; which claims priority from Great Britain Patent Application No. 1909187.5 filed on Jun. 26, 2019; the entirety of both are hereby incorporated herein by reference.

FIELD

This invention relates to generally to image demosaicing.

BACKGROUND

Colour cameras typically have an image sensor overlaid with a colour filter array, for example a Bayer filter. Image demosaicing can be used to reconstruct a full colour image from the incomplete colour data provided by such an image sensor.

FIG. 1 shows an image sensor bearing a colour filter array with a Bayer filter pattern. Each pixel has a respective colour filter; in the Bayer pattern a set of 4 pixels has two green (G), one red (R), and one blue (B) filter. Demosaicing provides R, G, and B values for each pixel.

There are various techniques for image demosaicing; the Malvar-He-Cutler method is described and compared with other methods in "Malvar-He-Cutler Linear Image Demosaicing", P. Getreuer, Image Processing On Line, 1 (2011), pp 83-89. A green value at the location of a red (or blue) pixel is determined by bilinear interpolation between green values of the 4 axially neighbouring green pixels. A correction is made using a Laplacian of the values from the local red (or blue) pixels. Other colour values are determined in a broadly similar way. Another approach is described in JP2013/207440, but there are cases for which this approach does not work well.

The inventors have previously described a whiteboard data capture and sharing system (WO2016/128761). This involves a colour camera positioned above the whiteboard and directed at an acute angle towards the whiteboard. The camera has a relatively wide field of view to cover the corners of the whiteboard. Such an arrangement is prone to chromatic aberration and existing demosaicing algorithms either perform poorly, especially with small or sharp-edged features such as writing, or are computationally expensive (e.g. "Joint chromatic aberration correction and demosaicking", Singh & Singh, Proc. SPIE, vol. 8299, id 8299D (2012)). More generally chromatic aberration becomes more detectable as the number of pixels in colour camera image sensors increases.

There is therefore a need for improved image demosaicing techniques.

SUMMARY

In one aspect there is therefore described a method of chromatically-corrected image demosaicing. The method comprises inputting image data from an image sensor of an imaging system with chromatic aberration. The image sensor has a plurality of pixels at respective pixel positions and a colour filter array (CFA) defining a pattern of colour filters, one colour filter over each pixel. The image data comprises a pixel value for each pixel of the image sensor. The method comprises demosaicing the image data to determine a colour value for one or more e.g. each of a set of image colours at each pixel position, more particularly for a colour value for each filter colour of the CFA e.g. R, G, and B values for each pixel position.

The demosaicing may comprise determining a first colour value (e.g. R, G, or B), for a target pixel covered by a filter of a second colour (e.g. R, G, or B). This may comprise determining a neighbouring set of pixels, e.g. a 2D set of pixels, covered by a filter of the first colour which have pixel positions neighbouring the pixel covered by the filter of the second colour. Determining the neighbouring set of pixels includes compensating for chromatic aberration when determining pixel positions neighbouring the target pixel, i.e. when determining the neighbouring set of pixels. In implementations the compensating for chromatic aberration comprises determining a chromatically-corrected position of the target pixel (target position) or determining chromatically-corrected positions of each of the neighbouring set of pixels.

That is, either the position of the target pixel may be compensated for chromatic aberration or the positions of the neighbouring set of pixels may be compensated for chromatic aberration. The set of chromatically-corrected pixel positions may surround the target position. In some implementations there may be four such chromatically-corrected pixel positions.

The demosaicing may further comprise spatially interpolating between pixel values of the neighbouring set of pixels, i.e. those covered by a filter of the first colour, to determine the first colour value for the target pixel. Where a chromatically-corrected position for each of the neighbouring set of pixels is determined the spatial interpolating may use the chromatically-corrected pixel positions for the interpolation.

The demosaicing may further comprise adjusting the first colour value dependent upon a local image brightness variation i.e. in a region around the target pixel. In implementations this provides a correction to the first, interpolated colour value dependent upon the local image brightness.

In implementations the first and second colours may be the same or different. For example the first colour may be red (or blue) and the second green to determine a red (or blue) colour value for a green pixel, or each of the first and second colours may be red (or blue) to determine a chromatic aberration-corrected red (or blue) colour value for a red (or blue) pixel (location). Further combinations are described later.

In implementations the method recognises that light which nominally arrives at, say a red pixel, would have arrived at a different location were it not for the chromatic aberration. Thus in implementations the method applies chromatic aberration correction to find nearest neighbour locations to the target pixel position, and the pixel values at these locations, in this example red pixel values, are then interpolated to determine the first, e.g. red, colour value for the target pixel.

The target pixel position may be defined by the position of a pixel covered by a filter of the second colour. The pixel positions for one of the colours, e.g. a third colour, e.g. green, may be arbitrarily taken to specify a reference grid of pixel positions with respect to which the chromatic position correction is defined. In general, but not essentially, the third colour is different to the first colour (in principle, for example, interpolation may be used to determine a green colour value for a green pixel). The image brightness variation may defined by a set of third colour values of a set of pixels each covered by a filter of the third colour in the region around the target pixel.

Determining the chromatically-corrected position of a pixel may comprise adjusting a position of the pixel by a chromatic position correction dependent upon the chromatic aberration. The chromatic position correction may thus depend upon the first colour i.e. on the colour whose value is being determined.

The chromatically-corrected pixel position(s) may comprise positions corrected, potentially imperfectly, for chromatic aberration. For example, light of the third colour, e.g. green, may come from a particular location and implementations of the method may effectively determine where on the image sensor light of the first colour, e.g. red, from the same location, arrives on the image sensor. Thus a pixel position may effectively be corrected for displacement of light of the first colour due to chromatic aberration of the imaging system.

The chromatic position correction may be any form of linear or non-linear spatial correction. In some implementations it is convenient to define a local chromatic position correction as a pair of x- and y-offset values ($\delta x, \delta y$) to apply to each position of a pixel covered by a filter of the first colour with respect to the (x,y) position of a pixel covered by a filter of the third colour. The x- and y-offset values may thus define the local chromatic aberration for the first colour, e.g. red and/or blue, with respect to the third colour, e.g. green. A pair of x- and y-offset values may be defined for each (first) colour apart from the reference colour, e.g. for each of red and blue with respect to green. These offset values may be determined e.g. at factory calibration; they may be stored in a non-volatile data store associated with an image processor performing the demosaicing.

In some implementations the neighbouring set of pixels (covered by a filter of the first colour) comprises a set of four pixels. In some implementations the spatial interpolating comprises bilinear interpolation between the positions of the neighbouring set of pixels. A chromatically-corrected pixel position may be an absolute position or a relative position.

The bilinear interpolating may comprise multiplying each pixel value of the neighbouring set of pixels by a product of x- and y-difference values dependent upon, respectively, the x- and y-offset values. This is effectively bilinear interpolation between the pixel values of the neighbouring set of pixels (covered by a filter of the first colour) to determine the first colour value for the target pixel, where the bilinear interpolation takes into account chromatic aberration. This bilinear interpolation may use the chromatically-corrected position of the target pixel, or chromatically-corrected positions of each of the neighbouring set of pixels.

As previously described, in implementations the first colour value is adjusted dependent upon an image brightness variation in a local region of the colour filter array around the target pixel. This brightness variation may be defined by a set of third colour values of a set of pixels in the region, where each of these pixels is covered by a filter of the third colour. The region may be centred on the target pixel, in implementations on the chromatically-corrected target pixel position. Thus the set of pixels may comprise pixels neighbouring the (chromatically-corrected) target pixel position. These neighbouring pixels may include nearest-neighbours, next nearest-neighbours and so forth, for example out to up to a distance of up to 2, 3, 5, 10 or 20 pixels in any direction.

This third colour may be green as green provides a good representation of brightness variations, and/or the third colour may be a colour which is more frequently represented in the colour filter array than the other colours. For example in implementations the colour filter array is a Bayer filter, in which case the green pixels are twice as frequent as each of red and blue pixels.

In implementations adjusting the first colour value may comprise determining an adjustment from the third e.g. green colour values in the local region, for example by performing a convolution over the third colour values (that is, a convolution which processes only third colour values, disregarding the other colour values).

Conceptually the adjustment represents an estimate of the error introduced by the interpolation being applied. Bilinear interpolation is exact when the first spatial derivatives of the function being approximated are zero, and accordingly the error may be well approximated as a combination of the second derivatives or discrete approximations thereto. Discrete approximations to these second derivatives may be obtained by convolution with suitably chosen kernels.

This may be done in one dimension, or two orthogonal dimensions in the array. In the latter case first and second partial adjustments may be determined, e.g. by performing first and second convolutions; the kernel of one convolution may be the transpose of the other. The two partial adjustments represent the brightness variation in each of the two orthogonal directions in the array. These may be combined to determine the adjustment, for example by summing the partial adjustments, optionally each scaled by a quadratic function of the respective x- or y-offset as described below.

Once an adjustment to the first colour value has been determined it may itself be modified, i.e. corrected, according to the chromatic aberration correction applied during the interpolation. The interpolation is subject to an error which depends upon the distance of the target pixel location from the chromatically-corrected pixel positions used in the interpolation. Thus the adjustment according to the local brightness variation may itself be modified according to the distance from these positions.

Modifying the adjustment using the chromatic position corrections may comprise scaling the adjustment dependent upon a distance (e.g. offset or displacement) between the target pixel and one or more of the neighbouring pixels compensated for chromatic aberration, e.g. scaling the adjustment using the chromatic position correction of e.g. the target pixel. For example a partial adjustment in an x-direction in the array may be modified by scaling this adjustment by a product of the x-distances between the chromatically-corrected target pixel position and the positions of the neighbouring set of pixels (pairs of these have the same x-position). A partial adjustment in the y-direction may be similarly scaled.

Thus modifying the adjustment may comprise scaling the adjustment by a quadratic function of the chromatic position correction for the target pixel. More particularly modifying the adjustment may comprise scaling the adjustment by a value dependent upon a quadratic function of the x-offset value for the target pixel to provide an x-dependent adjustment, scaling the adjustment by a value dependent upon a quadratic function of the y-offset value for the target pixel to provide a y-dependent adjustment, combining the x-dependent adjustment and y-dependent adjustment, e.g. by summing, to provide an adjustment correction, and applying the adjustment correction to the adjustment.

The adjustment or modified i.e. corrected adjustment, may be applied to the first colour value, e.g. by summing. Alternatively the adjustment or modified adjustment, may be applied in some other manner, for example by scaling the modified adjustment according to a local value or average local value of the first colour, e.g. red or blue, relative to the third colour, e.g. green, or by scaling by a ratio of the difference between each of these and a white level. Broadly speaking some implementations of the technique assume that brightness varies faster than hue, so that the spatial variation in one colour can be used to adjust another colour.

In some implementations, therefore, determining the chromatically-corrected position of a pixel may comprise adjusting a position of the pixel by a chromatic position correction dependent upon the chromatic aberration. The adjusting may then comprise determining an adjustment from the third colour values, modifying the adjustment using the chromatic position correction for the or each chromatically-corrected pixel position to determine a modified adjustment, and applying the modified adjustment to the first colour value.

In some implementations the adjustment is dependent upon or substantially equal to a linear combination of one or more functions of the or each chromatic position correction. The method may then further comprise determining one or more coefficients of the linear combination from the third colour values. The one or more functions of the or each chromatic position correction may be substantially equal to quadratic functions of the or each chromatic position correction. The one or more coefficients may comprise linear combinations of the third colour values.

Adjusting the first colour value dependent upon the image brightness variation in the region around the target pixel may comprise adjusting the first colour value dependent upon, e.g. proportional to: an estimated second or higher partial derivative, with respect to position, of a set of third colour values of a set of pixels in the region each covered by a filter of a third colour; and/or a linear combination of quadratic functions of two spatial coordinates, with coefficients given by estimated second partial derivatives of the third colour values with respect to the spatial coordinates.

In implementations the colour filter array comprises a Bayer filter. Thus the colour filter array may comprise a quincunx of green pixels with alternate rows of blue pixels and red pixels filling the spaces. However the techniques described above are not limited to a particular pattern of coloured pixels, or in principle even to a 2D array of pixels.

Implementations of the above described method may be used to determine red and blue colour values at green pixels. Thus the first colour may be red or blue and the second colour may be green.

Implementations of the above described method may be used to determine chromatically corrected red and blue colour values at green pixel locations, that is the first colour may be red or blue and (like the third colour) the second colour may be green. Implementations of the above described method may also be used to determine chromatically corrected red and blue colour values at red and blue pixel locations, that is the first colour may be red or blue and the second colour may be red or blue. Implementations of the above described method may also be used to determine chromatically corrected green values at red and blue pixel locations, that is the first colour may be green and the second colour may be red or blue. In implementations the green value at a green pixel may be determined directly from the pixel value or by interpolation amongst other neighbouring green pixels, i.e. without using values from pixels having a red or blue filter.

In some implementations the method determines red, green and blue colour values for each pixel (position) of the image sensor.

The demosaicing described above need not be perfect for an improved image to be obtained. Thus the particular form of representation of local chromatic aberration is not essential. Similarly the mathematical manner in which the local chromatic aberration is taken into account is not essential and whilst, for example, a linear interpolation is convenient other forms of interpolation may also be used.

In some implementations the image data from the image sensor is pre-processed before demosaicing. For example the method may be used in an image capture and sharing system, in which case the pixel values from the image sensor may be pre-processed by a change detection and/or temporal averaging process.

In a related aspect there is provided processor control code to implement the above-described methods, for example on a general purpose computer system, or on a mobile device, or on a digital signal processor (DSP) or on configurable or dedicated hardware. The code is provided on a non-transitory physical data carrier such as a disk, CD- or DVD-ROM, programmed memory such as non-volatile memory (eg Flash) or read-only memory (Firmware). Code and/or data to implement the method may comprise source, object or executable code in a conventional programming language (interpreted or compiled) such as C, or assembly code, or code for a hardware description language. Such code and/or data may be distributed between a plurality of coupled components in communication with one another.

In a further related aspect there is provided an image processing system for chromatically-corrected image demosaicing. The system may comprise an input to receive image data from an image sensor of an imaging system with chromatic aberration. The image sensor may have a plurality of pixels at respective pixel positions and a colour filter array defining a pattern of colour filters, e.g. one colour filter over each pixel. The image data may comprise a pixel value for each pixel of the image sensor. The image processing system may include a demosaicing system to demosaic the image data to determine a colour value for one or more e.g. each of a set of image colours, at each pixel position. The demosaicing system may be configured to determine a first colour value for a pixel covered by a filter of a second colour. The demosaicing system may be further configured to determine a neighbouring set of pixels, each covered by a filter of the first colour, which have pixel positions neighbouring the target pixel. The demosaicing system may be further configured to compensate for chromatic aberration by i) determining a chromatically-corrected position of the target pixel, or ii) determining chromatically-corrected positions of each of the neighbouring set of pixels, when determining the neighbouring set of pixels. The demosaicing system may be further configured to spatially interpolate between pixel values of the neighbouring set of pixels to determine the first colour value. The demosaicing system may be further configured to adjust the first colour value dependent upon an image brightness variation in a region around the target pixel.

DRAWINGS

These and other aspects of the system will now be further described by way of example only, with reference to the accompanying figures, in which:

FIG. 1 a schematic diagram of an image sensor with a Bayer filter;

In the figures like elements are indicated by like reference numerals.

DESCRIPTION

Figure 1:
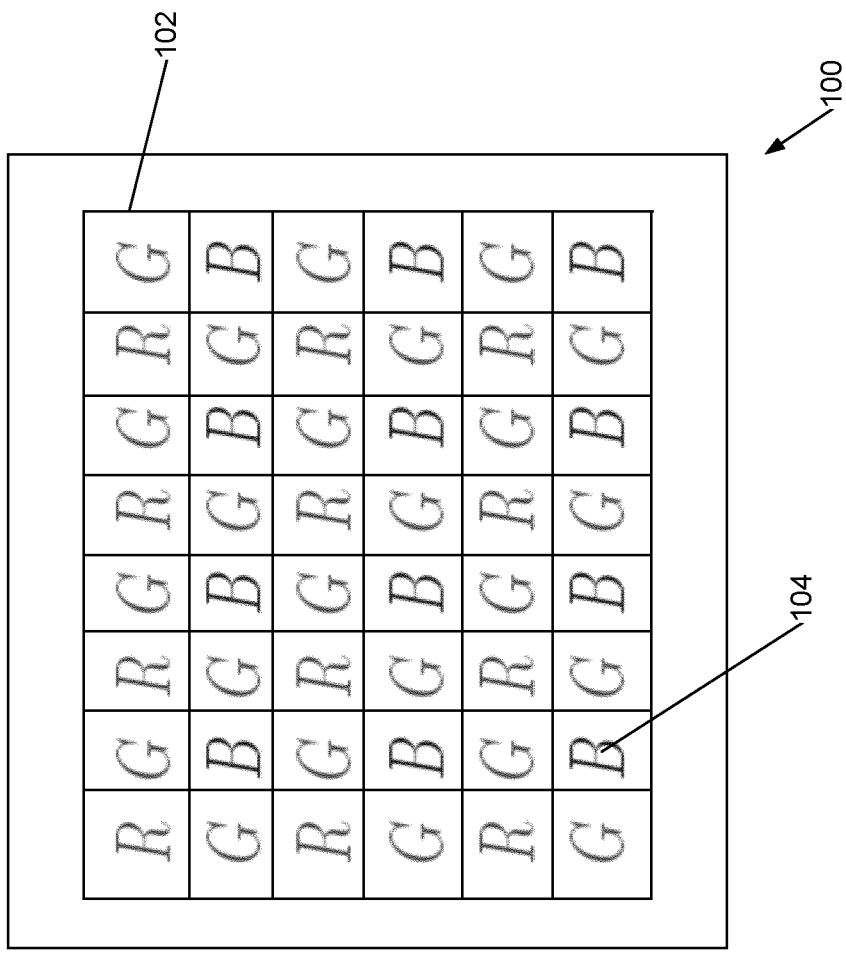

Referring to FIG. 1, this shows an image sensor 100 comprising a plurality of light sensitive pixels 102 at respective pixel positions in this example in a rectangular grid. The sensor is provided with a colour filter array 104 which covers each pixel with a colour filter having, in this example, one of three colours, red, blue, and green. Light is imaged onto the sensor by a lens or other focussing element (not shown in FIG. 1).

FIG. 1 shows a colour filter array which has a Bayer filter pattern. Thus green filters cover half the sensor pixels, and red and blue filters cover the remaining sensor pixels, all in a regular pattern.

Figure 2:
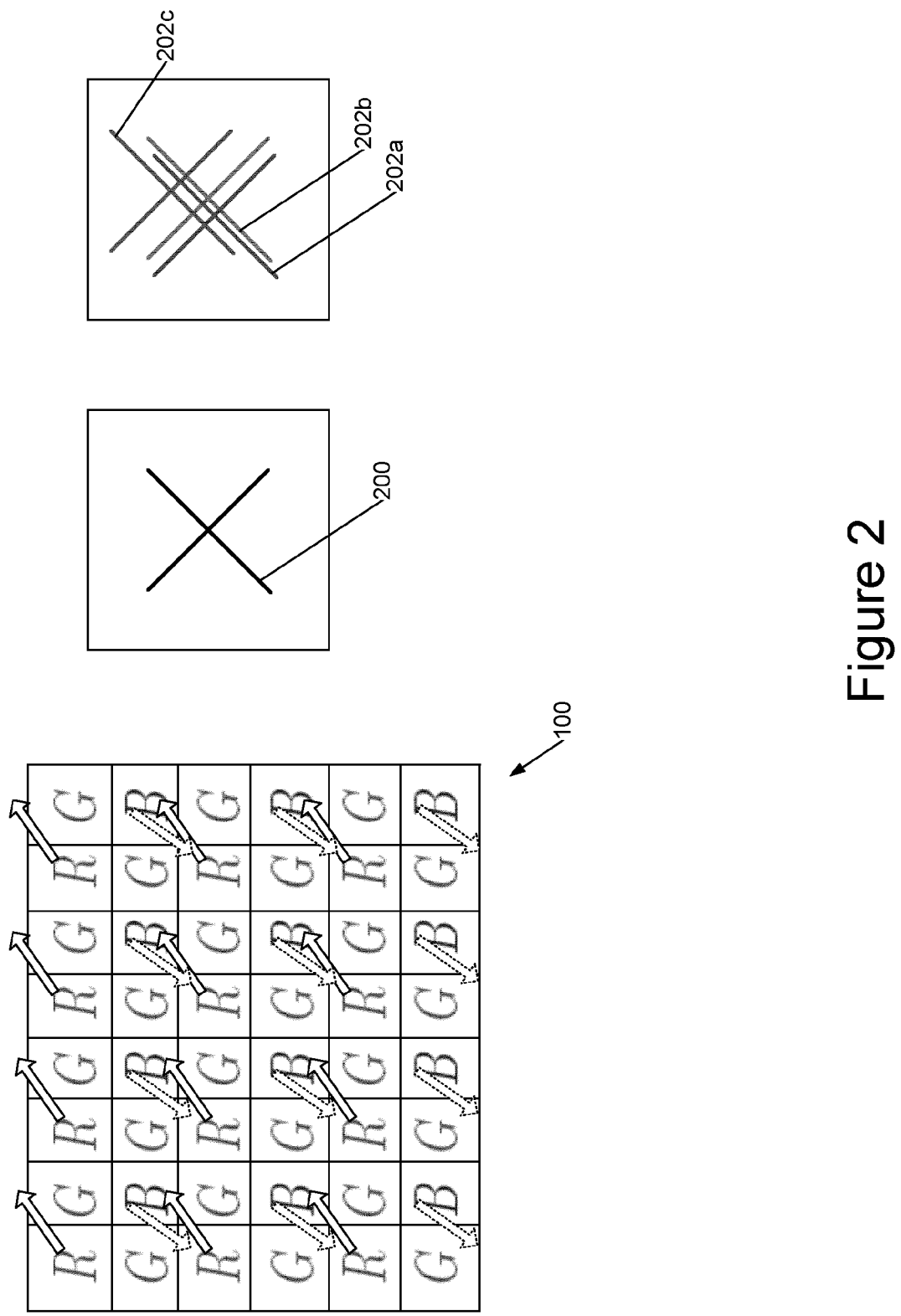
FIG. 2 illustrates chromatic aberration in an image sensor.

FIG. 2 illustrates chromatic aberration in the image sensor 100. In FIG. 2 one of the colours, here green, is taken as a reference. Light at the red pixel locations, R, absent chromatic aberration, would have been imaged at the locations indicated by the (solid) arrows from the red pixels. That is the red light at a red pixel location should be considered to have come from the locations at the tips of the red pixel arrows. In a similar way blue light at a blue pixel location should be considered to have come from the locations at the tips of the (dashed) blue pixel arrows.

FIG. 2 also shows how light from an object such as a cross 200 is split into R, G and B images 202a,b,c by chromatic aberration. The red image 202a, for example, is shifted down and to the left from its true position. The shift corresponds to the correction indicated by the arrows.

In implementations of the later described system the aberration is modelled by assuming that, locally, all the red pixels are displaced by a fixed amount with respect to the green pixels; blue pixels are treated similarly That is, arbitrarily, the locations of the green pixels are used as a local reference. This can model typical chromatic aberrations such as red/blue or green/purple fringing effects in the corners of an image, and red, green and blue images of slightly different sizes.

Red and blue colour values at, e.g. green pixel locations are effectively determined by interpolation between locations where the pixels should have been (with a perfect lens). The interpolation may be performed using bilinear or higher order interpolation or a more complex technique. Since there is an assumption of local invariance when determining the colour value at a location the nearest neighbor pixels are used for interpolation rather than more distant pixels, and chromatically corrected pixel positions are used when determining the nearest neighbours.

The raw image data from sensor 100 comprises pixel values for each of the pixels 102. The task of the image demosaicing procedure is to determine red, green and blue colour values for each pixel position.

As described above the red and blue pixel values are displaced from their correct positions by chromatic aberration, and thus the procedure should determine corrected red and blue values at the red and blue pixel positions as well as the missing colour values i.e. red and blue values for pixels covered by a green filter, and so forth.

Since the green pixel positions are taken as a reference grid, green colour values at these positions may be taken as the pixel values from the green pixels. Alternatively an interpolation and/or correction technique as described below may be applied to the green pixel values to determine green colour values at these pixels. For example a green colour value at a green pixel position may be determined by computing a local convolution over green pixel values only (i.e. disregarding red and blue pixels). For example the convolution kernel below may be applied to the green pixel values, to interpolate between green pixel values (the kernel below is centred at a green pixel position):

$$\frac{1}{9}\begin{pmatrix} & & -1 & & \\ & 2 & & 2 & \\ -1 & & 5 & & -1 \\ & 2 & & 2 & \\ & & -1 & & \end{pmatrix}$$

This can, for example, help to smooth the image and reduce artefacts.

Figure 3:
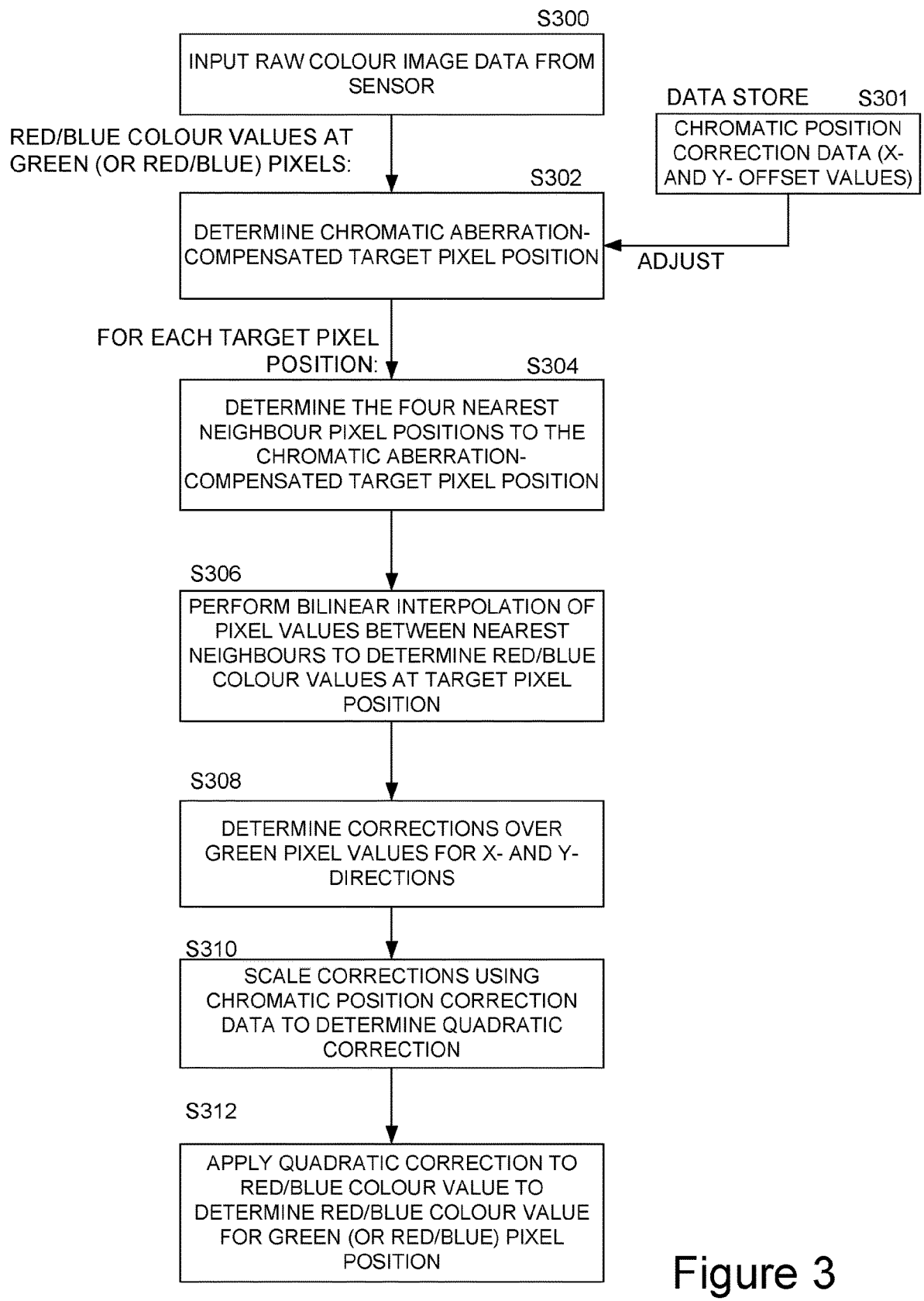
FIG. 3 is a flow diagram of chromatically-corrected image demosaicing procedure.

The image demosaicing procedure of FIG. 3 may be used to determine red and blue colour values at the location of a green pixel; this procedure compensates for chromatically aberration in an imaging system focussing light onto sensor 100. The procedure for determining a red colour value at the location of a green target pixel will be described; the same procedure may be used for determining a blue colour value (i.e. for "red" read "blue").

Thus at step S300 the procedure inputs raw image data from sensor 100. Chromatic position correction data is provided, S301, for example by retrieving this from non-volatile memory associated with the sensor and its imaging system. As described later the chromatic position correction data may comprise x- and y-offset values (δx,δy) to be applied to the target pixel position. Thus at step S302 the target pixel position is adjusted according to the chromatic position correction data (offset values), to compensate for the chromatic aberration. This may be performed as an initial step as illustrated in FIG. 3, or online during the procedure. In an alternative implementation the red or blue pixel positions may be chromatically corrected rather than the target pixel position.

Then for each chromatically-corrected target pixel position a set of nearest neighbour red (or blue) pixel positions is identified (S304). For example in some implementations four nearest neighbour pixel positions may be identified; in other implementations more or fewer nearest neighbours may be used.

The procedure then interpolates between the red (or blue) pixel values at the nearest neighbour pixel positions to determine the red (or blue) colour value, later, L, at the target pixel position (S306). The interpolation may be a bilinear interpolation or a higher order, or a simpler, interpolation. Details of an example bilinear interpolation are described later.

In some implementations the procedure then determines an adjustment (correction) to be applied to the red (or blue) colour value at the target, e.g. green, pixel position. For example the procedure may determine a curvature of green colour values in the x- and y-directions, and then determine the error that would be incurred by performing bilinear interpolation on green pixel values as it has been performed on red (or blue) pixel values. This provides an adjustment value (correction) which compensates for the crudity of bilinear interpolation. It is assumed that the change in red (or blue) colour values approximates the same curvature, and thus this correction may be applied to the red (or blue) value derived from the interpolation to provide a corrected red (or blue) value. This assumes that the correction relates more to image brightness than hue i.e. that brightness changes faster than hue. However the changes in red (or blue) pixel values and the changes in green pixel values are misaligned due to chromatic aberration. Thus, when making this correction, the chromatic position correction data is used to compensate for the misalignment. Further, the error incurred in bilinear interpolation depends upon the position at which the interpolant is evaluated: in particular, the error is zero if the position of interest after chromatic aberration correction happens to lie exactly under a pixel of the first colour. Hence the adjustment computed above should be scaled dependent upon the relation between the chromatically corrected location of the target pixel and the actual locations of pixels of the first colour, as explained later.

The correction has been described with reference to determining a curvature of the pixel value data in e.g. x- and y-directions, i.e. a second spatial derivative. However the correction may also be determined using some other spatial gradient, for example, a derivative of higher order. When using curvature the correction may be approximated by determining discrete approximations to the second derivatives using a set of local pixels i.e. pixels near to the chromatically-corrected position of the pixel whose colour value is to be determined. This may be implemented as a convolution over the local pixels.

Referring again to FIG. 3, the procedure may determine Laplacian-like corrections, based on curvature in the x- and y-directions, over green pixels neighbouring the target green pixel position (S308). These corrections may then be scaled using the chromatic position correction data (S310), and may be combined to determine an overall quadratic correction, later, Q. This quadratic correction may then be applied to the bilinear interpolated colour value, L, to determine an improved red (or blue) colour value for the green target pixel position (S312).

Essentially the same procedure may be used to determine red and blue colour values for red and blue pixel positions, as explained further later.

As an example implementation of the procedure of FIG. 3, suppose the local red chromatic aberration is $(\delta x, \delta y)$. This means that a red pixel value near $(x,y)$ comes from the same place as a green pixel value near $(x+\delta x, y+\delta y)$. This implies that to obtain a red value near the same location as green pixel $(x,y)$ the procedure needs to look near $(x-\delta x, y-\delta y)$.

Figure 4:
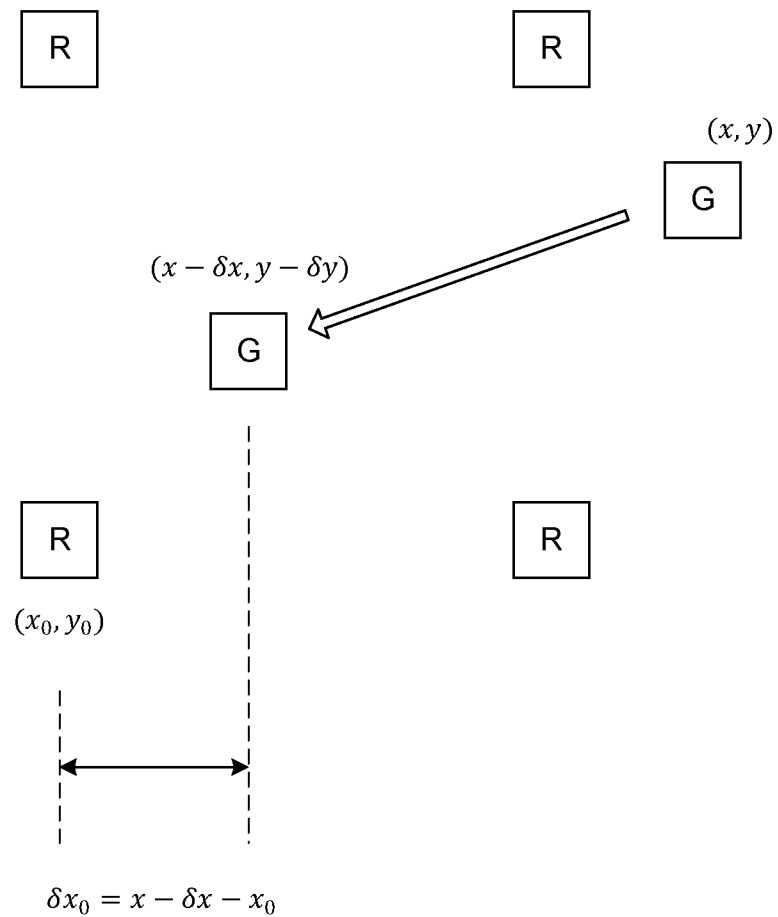
FIG. 4 illustrates a geometry for the procedure of FIG. 3.

This is illustrated in FIG. 4, where for convenience of illustration the green pixel is shown as displaced (though in implementations the green pixels define the reference grid).

Let the four nominally-red pixel locations surrounding $(x-\delta x, y-\delta y)$ be $(x_0, y_0)$, $(x_0, y_1)$, $(x_1, y_0)$, and $(x_1, y_1)$ where $\bullet_1 = \bullet_0 + 2$ (recalling that red pixels are spaced two apart on each axis) and $(\delta x, \delta y)$ are in units of pixel spacing (e.g $\delta x=1$ corresponds to one pixel spacing in the x-direction). Let the red pixel values corresponding to these locations be denoted $r_{00}, r_{01}, r_{10}, r_{11}$ respectively. Thus the differences between the x-positions and y-positions for the locations between which the interpolation is performed are $\delta x_i = x - \delta x - x_i$ and $\delta y_i = x - \delta y - y_i$. Thus $-2 \leq \delta x_1, \delta y_1 \leq 0 \leq \delta x_0, \delta y_0 \leq +2$ and $\delta x_0 = \delta x_1 + 2$, and likewise for y.

Thus a bilinear interpolation, L, between the red pixel locations to obtain a red value at the chromatically-corrected target pixel position is given by:

$$\frac{1}{4}[(-\delta x_1)(-\delta y_1)r_{00} + (-\delta x_1)\delta y_0 r_{01} + \delta x_0(-\delta y_1)r_{10} + \delta x_0 \delta y_0 r_{11}]$$

Discrete approximations to the second derivative may be used to estimate the curvature of the local image brightness. These are applied to the green pixel values only, and may be implemented as convolutions. For example a value $\alpha$ for determining a correction based on curvature in the x-direction, i.e. a correction with quadratic dependence on x, may be given by e.g. a convolution over green pixel values with a kernel (centred at a green pixel position):

$$\frac{1}{48} \begin{pmatrix} & & 1 & & \\ & -2 & & -2 & \\ 7 & & -8 & & 7 \\ & -2 & & -2 & \\ & & 1 & & \end{pmatrix}$$

Other kernels may be used, e.g. adjusting the coefficients for more efficient computation or using more or fewer points.

For example a value $\beta$ for determining a correction based on curvature in the y-direction may be determined similarly, for example by convolution with the transpose of the above kernel.

A quadratic correction, Q, to be applied to the red colour value, corrected for chromatic aberration (local chromatic displacement), is then given by $\delta x_0 \delta x_1 \alpha + \delta y_0 \delta y_1 \beta$.

In one approach the red colour value used is then given by L+Q. In another approach the correction can be scaled by a ratio of local red and green values, R, G, e.g. from one or more nearby pixels, optionally averaged so that the red colour value used is given by $$L + \frac{R}{G}Q.$$

In a further approach the correction may be scaled by a ratio of differences between the local red and green values and respective white values. For example if $R_w, G_w$ denote red and green values when a white object is imaged then the red colour value used may be given by $$L + \frac{R_w - R}{G_w - G}Q$$

The same process as that described above may be used to determine a blue colour value at a green pixel position.

Determination of a green colour value at a green pixel position has already been described. In implementations this only uses pixel values from green pixels.

There is now described determination of green colour values for red (and blue) pixels; and determination of red and blue colour values for red and blue pixels.

Implementations of the above described method may also be used to determine chromatically corrected green values at red and blue pixel locations; as described previously the first colour may be green and the second colour may be red or blue.

To determine green colour values at red (or blue) pixel locations the procedure simply interpolates green pixel values; no correction Q is required. For example the interpolated pixel value may be determined by convolution with the kernel below (centred at a red or blue pixel position):

$$\frac{1}{32}\begin{pmatrix} & -1 & & -1 & \\ -1 & & 10 & & -1 \\ & 10 & & 10 & \\ -1 & & 10 & & -1 \\ & -1 & & -1 & \end{pmatrix}.$$

This convolution is performed for the red and blue pixel positions i.e. for the non-green pixels (i.e. it is not a convolution which is applied to every pixel of the image). As can be seen, the convolution is applied to the green pixel values—that is in implementations all green pixel values are obtained only from green pixels and red and blue pixel values are not used in computing green (output) pixel values.

The procedure for determining red and blue colour values at red and blue pixel positions is very similar to that for determining red and blue colour values at green pixel positions. The red and blue pixel values are each offset from their true positions by chromatic aberration. Thus in implementations a correction is made for chromatic aberration when determining red colour values for both red and blue pixels, and when determining blue colour values for both red and blue pixels. The only difference is in the calculation of the correction, since it is derived from green pixel values and we are now considering pixel positions that do not lie on the green-pixel lattice.

Thus the procedure may comprise determining the local chromatic position correction data (δx,δy), for example by retrieving this from storage. Four red/blue pixel positions surrounding the chromatically corrected target position (x−δx,y−δy) are then identified and bilinear interpolation is performed as previously described, e.g. using the same formula for L.

The quadratic correction, Q, is likewise determined in the same way as previously described, except that a different kernel is used for determining α and β (describing the quadratic dependence on x and y respectively).

For example to determine α a 12-point estimate of the second derivative with respect to x may be determined by convolution over non-green pixel values with the kernel below. The kernel is centred at a red or blue pixel position; the non-zero values in the kernel are defined at green pixel positions:

$$\frac{1}{608}\begin{pmatrix} & -5 & & -5 & \\ 43 & & -46 & & 43 \\ & -30 & & -30 & \\ 43 & & -46 & & 43 \\ & -5 & & -5 & \end{pmatrix}$$

Convolution with the transpose of this kernel may be used for determining β. The correction Q may then be determined as previously described, and L and Q may be combined, for example by summation, to determine a red or blue colour value for the target pixel.

As previously described, approximations to the example kernels given above may be employed, e.g. to speed up computation. For example the factor of 1/608 may be converted to a factor of 1/128, which is easily implemented by bit-shifting, by approximating the kernel as:

$$\frac{1}{128}\begin{pmatrix} & -1 & & -1 & \\ 9 & & -10 & & 9 \\ & -6 & & -6 & \\ 9 & & -10 & & 9 \\ & -1 & & -1 & \end{pmatrix}.$$

Figures 5A, 5B:
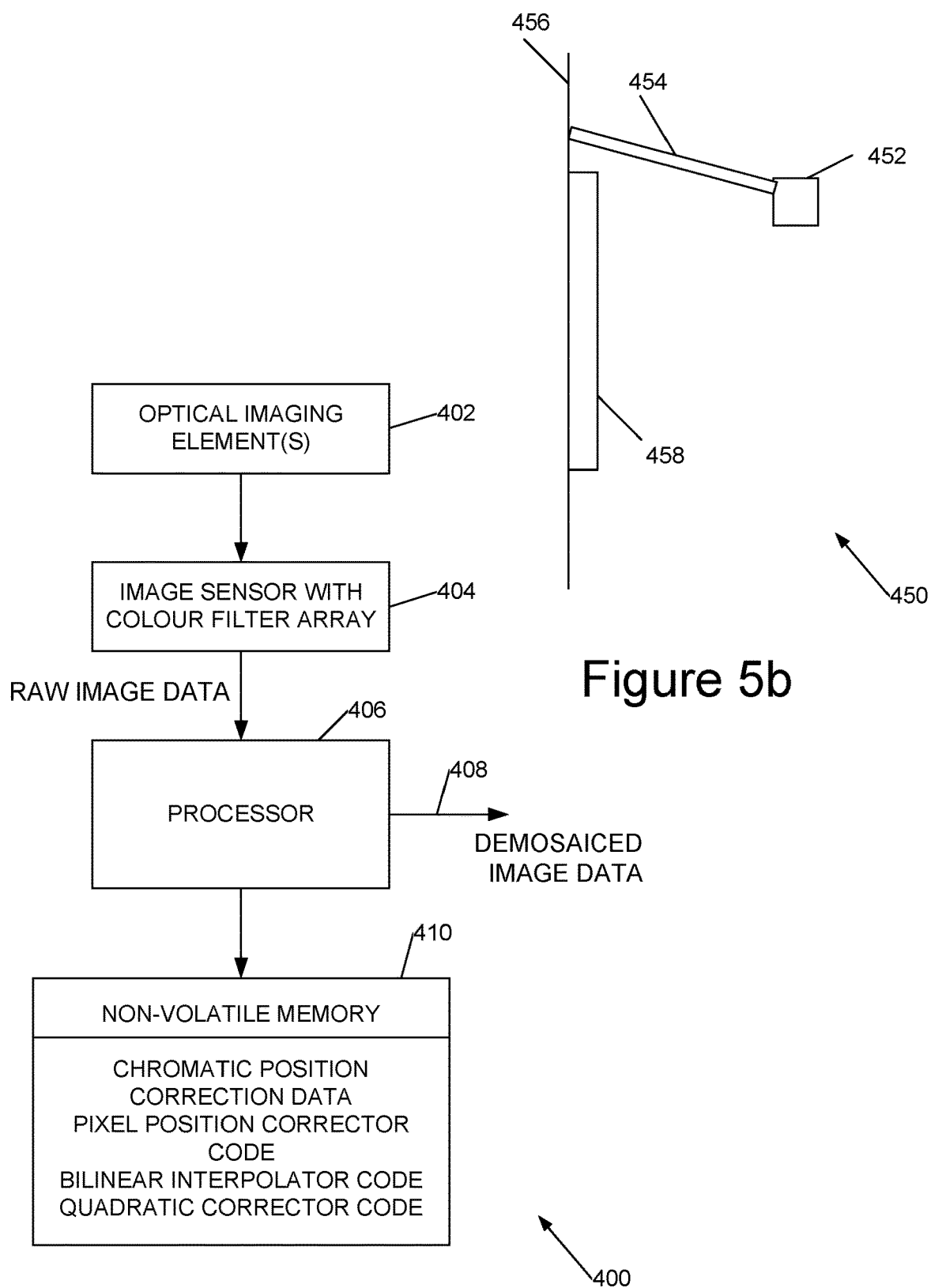
FIGS. 5a and 5b show, respectively, a block diagram of an imaging system configured to implement chromatically-corrected image demosaicing, and a data capture and sharing system incorporating the imaging system.

FIG. 5a shows a block diagram of an imaging system 400 configured to implement the above described chromatically-corrected image demosaicing.

The imaging system comprises one or more optical elements 402, such as one or more lenses, configured to form an image on an image sensor 404 bearing a colour filter array, for example an image sensor as shown in FIG. 1. Image data from the image sensor, which may be raw or pre-processed image data, comprising pixel value data for the sensor pixels, is provided as an input to a processor 406.

In some implementations processor 406 operates under control of stored program code (as shown) to implement the described image demosaicing and provide a demosaiced image output 408. In other implementations processor 406 implements some or all of the image demosaicing functions in hardware, for example in an ASIC or FPGA.

As illustrated, processor 406 is coupled to non-volatile memory 410 which stores chromatic position correction data, as well as pixel position corrector code, bilinear interpolator code and quadratic corrector code to determine chromatically-corrected pixel positions and L and Q values as described.

FIG. 5b shows an example application of the imaging system 400 in a data capture and sharing system 450. Thus a camera 452 comprising the imaging elements 402 and image sensor 404 is mounted by a support 454 on a wall 456 so that it may be directed an acute angle towards a surface 458 such as a whiteboard to capture a colour image of writing/drawing on the surface. The acute angle image capture and sharp edges and fine detail in the image make chromatic aberration a particular problem. Thus the above described image demosaicing techniques are particularly helpful for such an application. The image processing may be implemented locally, for example in or in association with the camera, or remotely.

As the resolution of camera image sensors continues to rise the effects of chromatic aberration are also becoming more important in general purpose cameras. Thus other applications include (but are not limited to) the image sensors of colour cameras in consumer electronic devices such as mobile phones and mobile computing devices.

Many alternatives will occur to the skilled person. The invention is not limited to the described embodiments and encompasses modifications apparent to those skilled in the art lying within the spirit and scope of the claims appended hereto.

The invention claimed is:
1. A method of chromatically-corrected image demosaicing, the method comprising:
   inputting, to a processor by an image sensor comprised of light sensitive pixels, image data comprised of pixel values for the pixels;
   determining, by the processor when demosaicing the image data, the pixels neighbouring a targeted one of the pixels;
   compensating, by the processor when determining the pixels neighbouring the targeted one of the pixels, chromatic aberration of an image processing system comprised of the image sensor and the processor;

obtaining, by the processor when spatially interpolating between the pixel values for the pixels neighbouring the targeted one of the pixels, a colour value for the targeted one of the pixels; and adjusting, when demosaicing the image data, the colour value dependent upon an image brightness variation in a region around the targeted one of the pixels, wherein adjusting the colour value comprises:
  determining an adjustment to the colour value and scaling the adjustment dependent upon a distance between the targeted one of the pixels and one or more of the neighbouring pixels compensated for chromatic aberration.

2. The method of claim 1, wherein the region around the targeted one of the pixels comprises a local region of the colour filter array.

3. The method of claim 1, wherein the image brightness variation is defined by a set of colour values for a set of the pixels in the region each covered by a filter of a filter colour.

4. The method of claim 1, wherein the adjustment is dependent upon or substantially equal to a linear combination of one or more functions of the chromatic position correction,
  the method further comprising:
  determining one or more coefficients of the linear combination from the colour values.

5. The method of claim 4, wherein the one or more functions of the or each chromatic position correction are quadratic functions of the or each chromatic position correction.

6. The method of claim 4, wherein the one or more coefficients comprise linear combinations of the colour values.

7. The method of claim 1, wherein adjusting the colour value dependent upon an image brightness variation in a region around the targeted one of the pixels comprises:
  performing a convolution over pixel values in the region around the targeted one of the pixels.

8. The method of claim 1,
  wherein the colour filter array is a 2D array defining a 2D pattern of colour filters, wherein the neighbouring set of pixels comprises a set of pixels in two dimensions, and
  wherein determining the adjustment comprises:
  determining first and second partial adjustments representing the image brightness variation in each of two orthogonal directions in the array, and
  combining the first and second partial adjustments to determine the adjustment.

9. The method of claim 1 wherein the colour value is green.

10. The method of claim 3,
  wherein the colour filter array comprises a Bayer filter, and
  wherein the filter colour is green.

11. The method of claim 1,
  wherein the neighbouring set of pixels comprises a set of four pixels, and
  wherein the spatial interpolating comprises bilinear interpolation.

12. A method of chromatically-corrected image demosaicing, the method comprising:
  inputting, to a processor by an image sensor comprised of light sensitive pixels, image data comprised of pixel values for the pixels;

determining, by the processor when demosaicing the image data, the pixels neighbouring a targeted one of the pixels;

compensating, by the processor when determining the pixels neighbouring the targeted one of the pixels, chromatic aberration of an image processing system comprised of the image sensor and the processor;

obtaining, by the processor when spatially interpolating between the pixel values for the pixels neighbouring the targeted one of the pixels, a colour value for the targeted one of the pixels; and adjusting, when demosaicing the image data, the colour value dependent upon an image brightness variation in a region around the targeted one of the pixels, wherein adjusting the colour value dependent upon the image brightness variation in the region around the targeted one of the pixels comprises:
  adjusting the colour value dependent upon an estimated second or higher partial derivative, with respect to position, of a set of colour values for a set of the pixels in the region each covered by a filter of a filter colour.

13. A method of chromatically-corrected image demosaicing, the method comprising:
  inputting, to a processor by an image sensor comprised of light sensitive pixels, image data comprised of pixel values for the pixels;

determining, by the processor when demosaicing the image data, the pixels neighbouring a targeted one of the pixels;

compensating, by the processor when determining the pixels neighbouring the targeted one of the pixels, chromatic aberration of an image processing system comprised of the image sensor and the processor;

obtaining, by the processor when spatially interpolating between the pixel values for the pixels neighbouring the targeted one of the pixels, a colour value for the targeted one of the pixels; and adjusting, when demosaicing the image data, the colour value dependent upon an image brightness variation in a region around the targeted one of the pixels, wherein adjusting the colour value dependent upon the image brightness variation in the region around the targeted one of the pixels comprises:
  adjusting the colour value dependent upon a linear combination of quadratic functions of two spatial coordinates, with coefficients given by estimated second partial derivatives of the colour values with respect to the spatial coordinates.

14. A non-transitory data carrier carrying processor control code to implement the method of claim 1.

15. The method of claim 1, wherein compensating the chromatic aberration comprises:
  determining a chromatically-corrected position of the targeted one of the pixels.

16. The method of claim 15,
  wherein determining the chromatically-corrected position of the targeted one of the pixels comprises:
  adjusting a position for each of the pixels in the region by a chromatic position correction dependent upon the chromatic aberration, and
  wherein the adjusting comprises:
  determining an adjustment from the filter colour,
  modifying the adjustment using the chromatic position correction for each chromatically-corrected pixel position to determine a modified adjustment, and
  applying the modified adjustment to the colour value.

17. The method of claim 15, wherein determining the chromatically-corrected position of the targeted one of the pixels comprises:
 applying x- and y-offset values to a position of the pixel.

18. The method of claim 1, wherein compensating the chromatic aberration comprises:
 ascertaining, when determining the pixels neighbouring the targeted one of the pixels, chromatically-corrected positions for each of the pixels neighbouring the targeted one of the pixels.

* * * * *